US012244453B2

(12) United States Patent
Liu et al.

(10) Patent No.: US 12,244,453 B2
(45) Date of Patent: Mar. 4, 2025

(54) ABNORMAL DATA DETECTION METHOD, SYSTEM AND DEVICE FOR INDUSTRIAL INTERNET

(71) Applicant: Yantai University, Yantai (CN)

(72) Inventors: Zhaowei Liu, Yantai (CN); Dezhi Guo, Yantai (CN); Haiyang Wang, Yantai (CN); Weiqing Yan, Yantai (CN); Jindong Xu, Yantai (CN); Yongchao Song, Yantai (CN)

(73) Assignee: Yantai University, Yantai (CN)

( * ) Notice: Subject to any disclaimer, the term of this patent is extended or adjusted under 35 U.S.C. 154(b) by 0 days.

(21) Appl. No.: 18/754,075

(22) Filed: Jun. 25, 2024

(65) Prior Publication Data

US 2024/0430152 A1  Dec. 26, 2024

(30) Foreign Application Priority Data

Jun. 26, 2023 (CN) .......................... 202310759096.9

(51) Int. Cl.
*H04L 9/00* (2022.01)
*H04L 41/0631* (2022.01)
*H04L 41/16* (2022.01)

(52) U.S. Cl.
CPC .......... *H04L 41/0631* (2013.01); *H04L 41/16* (2013.01)

(58) Field of Classification Search
CPC . H04L 43/08; H04L 63/1408; H04L 63/1425; G06F 16/2365; G06F 16/278; G06F 16/2379
See application file for complete search history.

(56) References Cited

U.S. PATENT DOCUMENTS

| 12,034,587 | B1* | 7/2024 | Zafer | H04L 41/16 |
| 2020/0167784 | A1* | 5/2020 | Kursun | G06Q 20/4016 |
| 2020/0364084 | A1* | 11/2020 | Zheng | H04L 67/10 |
| 2021/0209483 | A1* | 7/2021 | Bose | G06N 5/025 |
| 2023/0089481 | A1* | 3/2023 | Liu | G06N 3/0455 |
| | | | | 706/15 |
| 2024/0036110 | A1* | 2/2024 | Goto | G01R 31/31704 |
| 2024/0171979 | A1* | 5/2024 | Naili | H04W 12/121 |
| 2024/0250975 | A1* | 7/2024 | Pourahmadi | H04L 63/1425 |

FOREIGN PATENT DOCUMENTS

| CN | 110823576 A | 2/2020 |
| CN | 112179691 A | 1/2021 |
| CN | 113052203 A | 6/2021 |

* cited by examiner

*Primary Examiner* — Romani Ohri
(74) *Attorney, Agent, or Firm* — Nitin Kaushik

(57) ABSTRACT

The present invention relates to the technical field of network security, and in particular to an abnormal data detection method, system and device for industrial Internet. This detection method compares data distribution of an initial node with a normal feature expression performance in first normal data distribution subject to extraction processing to obtain a first anomaly score, compares the data distribution of the initial node with the normal feature expression performance in second normal data distribution subject to enhancement processing to obtain a second anomaly score, obtains a risk level of the node based on the first anomaly score and the second anomaly score, and immediately provides corresponding limits on a node communication permission; and the method provides dual detection, is high in accuracy and stable in detection results, and facilitates the maintenance of industrial Internet security.

4 Claims, 3 Drawing Sheets

ABNORMAL DATA DETECTION METHOD, SYSTEM AND DEVICE FOR INDUSTRIAL INTERNET

CROSS-REFERENCE TO RELATED APPLICATIONS

The application claims priority to Chinese patent application No. 202310759096.9, filed on Jun. 26, 2023, the entire contents of which are incorporated herein by reference.

TECHNICAL FIELD

The present invention relates to the technical field of network security, and in particular to an abnormal data detection method, system and device for industrial Internet.

BACKGROUND

Industrial Internet has been widely used in chemistry, power, water, and wastewater infrastructure systems and other critical infrastructure systems. Nowadays, most of industrial control systems use information and communication technologies to control their industrial processes (such as electric vehicle charging stations, automobiles, trains and buses as well as many other applications). The combination of the industrial control systems and other information services makes industrial facilities face a new source of possible threats caused by network vulnerability capabilities.

All existing network security methods focus on detecting anomalies in a feature space, i.e. viewing data points having greater deviations from a normal space. In a detection method for an integrated control system, continuous production equipment generates a large volume of nonlinear and high-dimensional data, resulting in that system security personnel have the issues of low data processing efficiency and slow attack detection speeds. Moreover, there is a lot of noises in the data in the industrial Internet and a decision-making tree algorithm is prone to over-fit, which reduces the accuracy of detection results. A support vector machine requires a large amount of computer system resources when processing massive data. A traditional machine learning detection algorithm is unstable because it is prone to subject to a large number of parameters, uncertain structures and strong sample dependence. To sum up, existing industrial Internet detection methods have the problems of low detection efficiency, low detection quality, and unstable detection results, causing poor security of industrial Internet platforms.

SUMMARY

The present invention is intended to provide an abnormal data detection method, system and device for industrial Internet.

The present invention adopts the following technical solutions:

an abnormal data detection method for industrial Internet, including the following operations:

S1: acquiring real data distribution of a node and obtaining potential representation distribution based on the real data distribution; performing normal feature extraction processing on the potential representation distribution to obtain first normal data distribution; and comparing the real data distribution with the first normal data distribution to obtain a first anomaly score;

S2: performing normal feature enhancement processing on the real data distribution of the node to obtain second normal data distribution; and comparing the real data distribution with the second normal data distribution to obtain a second anomaly score;

S3: obtaining a total anomaly score based on the first anomaly score and the second anomaly score;

S4: comparing the total anomaly score with a threshold to obtain an anomaly risk level; and S5: updating a communication permission of the node based on the anomaly risk level.

According to the abnormal data detection method as described above, where the operation of obtaining the potential representation distribution in S1 is implemented through a minimax adversarial encoder; and the encoder is used for converting the real data distribution into the potential representation distribution;

the operation of obtaining the first normal data distribution in S1 is implemented through a minimax adversarial generator; and the generator is used for converting the potential representation distribution into the first normal data distribution;

the operation of obtaining the second normal data distribution in S2 is implemented through a minimax adversarial discriminator; and the discriminator is used for converting the real data distribution into the second normal data distribution.

The operation of minimax adversarial processing specifically includes:

acquiring an objective function including the encoder, the generator and the discriminator, and enabling the encoder, the generator and the discriminator to reach a Nash equilibrium state through a game of minimizing the value of the objective function and maximizing the value of the objective function.

Before the generator is subject to the minimax adversarial processing, the method further includes performing evolutionary training on the generator. The operation of the evolutionary training specifically includes:

step 1: converting normal data distribution in a normal node training set into potential representation distribution, and inputting the potential representation distribution into a generator to obtain a parent sample;

step 2: performing variation processing on the parent sample to obtain a child sample;

step 3: obtaining a quality evaluation score based on feature expression of the child sample;

step 4: if the quality evaluation score is less than a first standard value, eliminating the corresponding child sample; if the quality evaluation score is not less than the first standard value, performing step 5; and step 5: if the quality evaluation score is less than a second standard value, performing step 2 on the corresponding child sample as a new parent sample; and if the quality evaluation score is not less than the second standard value, finishing the training.

The quality evaluation score is obtained based on a generated sample quality score and a generated sample diversity score;

the generated sample quality score is an expected value of normal feature representation in the child sample; and the generated sample diversity score is obtained based on the normal feature representation in the normal data distribution and the normal feature representation in the child sample.

According to the abnormal data detection method as described above, the operation of S3 specifically includes: acquiring an equilibrium parameter, and based on the equilibrium parameter, carrying out weighting on the first anomaly score and the second anomaly score to obtain the total anomaly score.

According to the abnormal data detection method as described above, the operation of S4 specifically includes:
comparing the total anomaly score with a threshold to obtain the anomaly risk level;
if the total anomaly score is less than a first threshold, an abnormal data risk level of the node being a first risk level;
if the total anomaly score is not less than the first threshold and not greater than a second threshold, the abnormal data risk level of the node being a second risk level;
if the total anomaly score is greater than the second threshold and less than a third threshold, the abnormal data risk level of the node being a third risk level; and
if the total anomaly score is not less than a third threshold, the abnormal data risk level of the node being a fourth risk level.

An abnormal data detection system for industrial Internet, including:

A first anomaly score generation module, configured to: acquire real data distribution of a node and obtain potential representation distribution based on the real data distribution; perform normal feature extraction processing on the potential representation distribution to obtain first normal data distribution; and compare the real data distribution with the first normal data distribution to obtain a first anomaly score;
a second anomaly score generation module, configured to: perform normal feature enhancement processing on the real data distribution of the node to obtain second normal data distribution; and compare the real data distribution with the second normal data distribution to obtain a second anomaly score;
a total anomaly score generation module, configured to obtain a total anomaly score based on the first anomaly score and the second anomaly score;
an anomaly risk level generation module, configured to compare the total anomaly score with a threshold to obtain an anomaly risk level; and
a communication permission updating module, configured to update a communication permission of the node based on the abnormal data risk level.

An abnormal data detection system device for industrial Internet, including a processor and a memory, where the processor implements the abnormal data detection method for industrial Internet as described above when executing a computer program saved in the memory.

A computer-readable storage medium, which is configured to store a computer program, where the computer program implements the abnormal data detection method for industrial Internet as described above when being executed by a processor.

The beneficial effects of the present invention are as follows:
the present invention provides an abnormal data detection method for industrial Internet, which compares the data distribution of an initial node with a normal feature expression performance in first normal data distribution subject to extraction processing to obtain the first anomaly score, compares the data distribution of the initial node with the normal feature expression performance in second normal data distribution subject to enhancement processing to obtain the second anomaly score, obtains a risk level of the node based on the first anomaly score and the second anomaly score, and immediately provides corresponding limits on a node communication permission; and the method provides dual detection, is high in accuracy and stable in detection results, and facilitates the maintenance of industrial Internet security;
the present invention provides an abnormal data detection method for industrial Internet, which utilizes a training set containing only normal nodes to perform the evolutionary training on the generator, enhance the normal feature extraction capability and stability of the generator, and improve the detection efficiency of the detection method and the accuracy of final calculation results; in addition, the encoder, the generator and the discriminator are also subject to the minimax adversarial processing, which improves the mapping capability of the encoder, the normal feature extraction capability of the generator, and the normal feature enhancement capability of the discriminator, enhances the stability and calculation efficiency when high-dimensional data is processed by the detection method, and improves the stability and accuracy of the detection method.

BRIEF DESCRIPTION OF DRAWINGS

The solutions and advantages of the present application will become apparent to those of ordinary skill in the art upon reading the following detailed description of the preferred implementations. The accompanying drawings are only for the purpose of illustrating the preferred implementations and are not considered as limiting the present invention.

In the drawings.

DETAILED DESCRIPTION OF THE EMBODIMENTS

Exemplary implementations of the present disclosure will be described below with reference to the accompanying drawings.

Figure 1:
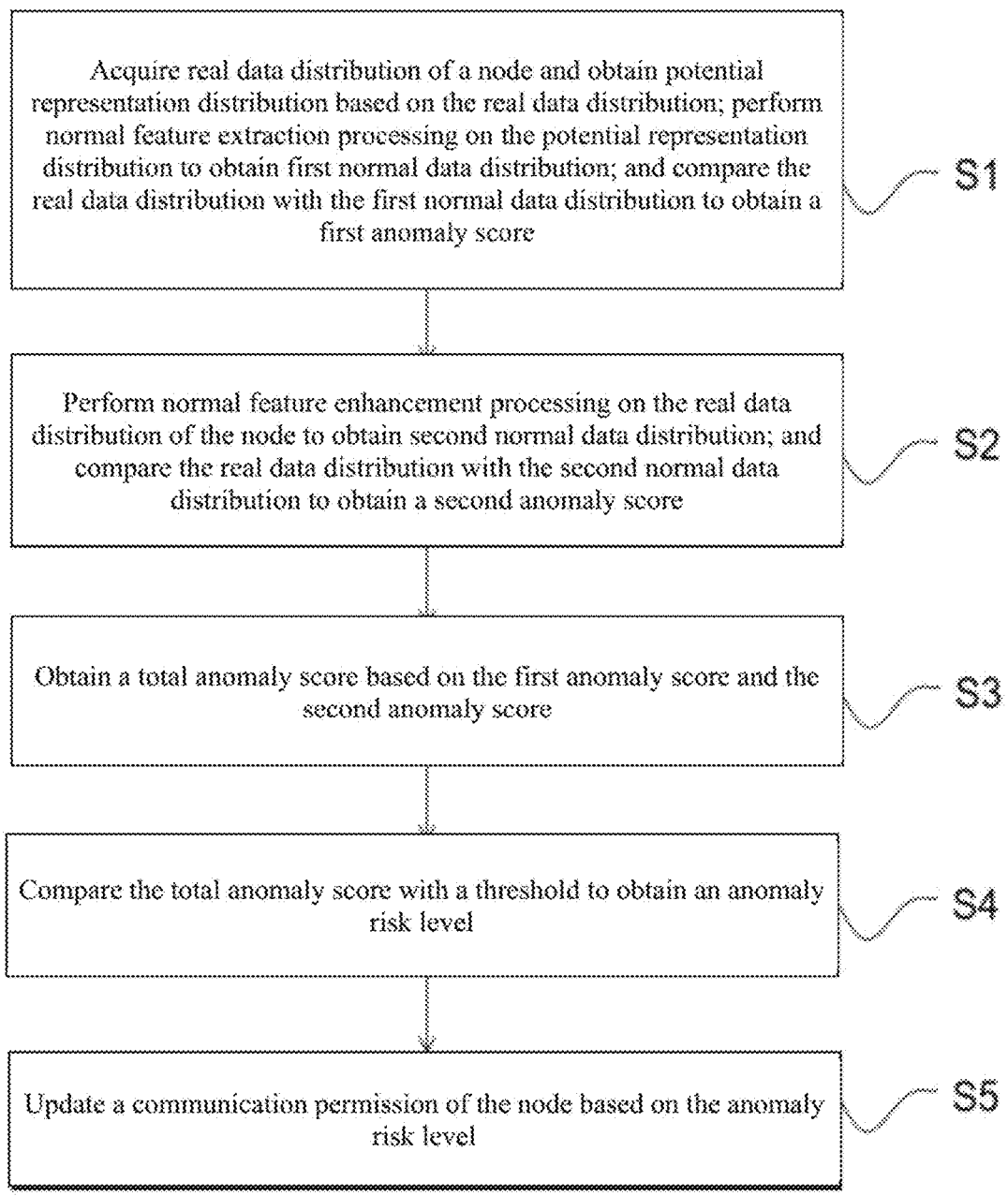
FIG. 1 is a schematic flowchart of a detection method in an embodiment.

This embodiment provides an abnormal data detection method for industrial Internet, as shown in FIG. 1, including:
S1: acquire real data distribution of a node and obtain potential representation distribution based on the real data distribution; perform normal feature extraction processing on the potential representation distribution to obtain first normal data distribution; and compare the real data distribution with the first normal data distribution to obtain a first anomaly score;
S2: perform normal feature enhancement processing on the real data distribution of the node to obtain second normal data distribution; and compare the real data distribution with the second normal data distribution to obtain a second anomaly score;

S3: obtain a total anomaly score based on the first anomaly score and the second anomaly score;

S4: compare the total anomaly score with a threshold to obtain an anomaly risk level; and S5: update a communication permission of the node based on the anomaly risk level.

S1: acquire the real data distribution of the node and obtain the potential representation distribution based on the real data distribution; perform the normal feature extraction processing on the potential representation distribution to obtain the first normal data distribution; and compare the real data distribution with the first normal data distribution to obtain the first anomaly score.

The operation of obtaining the potential representation distribution is implemented through a minimax adversarial encoder; the encoder is used for converting the real data distribution into the potential representation distribution; and the real data distribution of the node is inputted into the encoder and subject to mapping processing to obtain the potential representation distribution. Specifically, a regularization-based autoencoder (RAE) firstly maps the real data distribution to a potential feature space to form low-dimensional potential representation, and then, extends a between-class distance and shortens an inner-class distance of the potential representation through an improved regularization term to realize concentrated distribution of the potential representation in the potential feature space, so as to obtain more reasonable potential representation distribution.

The operation of obtaining the first normal data distribution is implemented through a minimax adversarial generator; the generator is used for converting the potential representation distribution into the first normal data distribution; and the potential representation distribution is inputted into the generator and subject to the normal feature extraction processing to obtain the first normal data distribution.

Before the generator is subject to minimax adversarial processing, the method further includes performing evolutionary training on the generator. The operation of the evolutionary training specifically includes: step 1: convert normal data distribution in a normal node training set into potential representation distribution, and input the potential representation distribution into a generator to obtain a parent sample; step 2: perform variation processing on the parent sample to obtain a child sample; step 3: obtain a quality evaluation score based on feature expression of the child sample; step 4: if the quality evaluation score is less than a standard value, eliminate the corresponding child sample; if the quality evaluation score is not less than the standard value, perform step 5; and step 5: if the quality evaluation score is less than a second standard value, perform step 2 on the corresponding child sample as a new parent sample; and if the quality evaluation score is not less than the second standard value, finish the training. An output of the trained generator is almost the same as testing data when the testing data is normal data, and normal features in node data can be more accurately extracted. The standard value and the number of iterations may be set according to actual requirements on the accuracy of the generator.

The quality evaluation score is obtained based on a generated sample quality score and a generated sample diversity score; the generated sample quality score is an expected value of the normal feature representation in the child sample; and the generated sample diversity score is obtained based on the normal feature representation in the normal data distribution and the normal feature representation in the child sample.

The quality evaluation score can be obtained through the following formula:

$$F = F_1 + \alpha F_2,$$

$$F_1 = \mathbb{E}_z[D(G(z))],$$

$$F_2 = -\log\|\nabla_D - \mathbb{E}_x[\log D(x)] - \mathbb{E}_z[\log(1 - D(G(z)))]\|,$$

F is the quality evaluation score, and F1 is the generated sample quality score; after the potential representation distribution z outputted by the encoder is inputted into the generator G, the generator G varies the potential representation distribution into child sample distribution, and a normal feature G(z) in the child sample distribution is extracted; the normal feature G(z) is inputted into the discriminator D, and then is calculated to obtain the expected value $\mathbb{E}_z[D)(G(z))]$ of the normal feature representation, where $\mathbb{E}$ is a mathematical expectation function; $F_2$ is the generated sample diversity score, the $\nabla_D$ is a gradient of the generator D, x is the normal data distribution, D(x) is the normal feature representation obtained by inputting the normal data distribution x into the normal D, α is a parameter for equilibrating the generated sample quality score F1 and the generated sample diversity score $F_2$, and α≥0.

S2: perform the normal feature enhancement processing on the real data distribution of the node to obtain the second normal data distribution; and compare the real data distribution with the second normal data distribution to obtain the second anomaly score.

The operation of obtaining the second normal data distribution is implemented through a minimax adversarial discriminator; the discriminator is used for converting the real data distribution into the second normal data distribution; and the real data distribution of the node is inputted into the minimax adversarial discriminator and subject to the normal feature enhancement processing to obtain the second normal data distribution. The discriminator is used for performing enhancement processing on normal features in the real data distribution, and performing information aggregation on the normal features in a current node and the normal features in its neighbor nodes to obtain the second normal data distribution with stronger relevance and stronger expression capability. The ratio of abnormal features in the node is usually small, such that the normal features of the node have the characteristic of strong relevance. Therefore, the more the normal features in the node, the more the number of edges existing between this node and other nodes and the stronger the relevance. The features of the neighbor nodes are aggregated in a manner of multiple iterations, such that the normal features of the node have better relevance and will maintain a high degree of heterogeneity. In addition, the discriminator may also be used for calculating the normal feature expression performance in the child sample distribution and discriminating the sizes of the quality evaluation score and the standard value while training the generator.

The operation of minimax adversarial processing specifically includes: acquire an objective function including the encoder, the generator and the discriminator, and enabling the encoder, the generator and the discriminator to reach a Nash equilibrium state through a game of minimizing the value of the objective function and maximizing the value of function.

The minimax adversarial processing can be implemented through the following formula:

$$\min_{G,E}\max_D V(G, E, D) = E_1 + E_2,$$

$$E_1 = E_{x \sim P_x}\left[E_{x \sim P_{E(\bullet|x)}}[\log D(x, z)]\right],$$

$$E_2 = E_{z \sim P_z}\left[E_{z \sim P_{G(\bullet|x)}}[1 - \log D(x, z)]\right],$$

V(G, E, D) is the objective function including the encoder E, the generator G and the discriminator D; $\mathbb{E}$ is a mathematical expectation function, x is normal data, px is initial normal data distribution, z is initial potential representation, pz is initial potential representation distribution, $P_{E(\cdot|x)}$ is potential representation distribution obtained by inputting the normal data x into the encoder E, $P_{G(\cdot|z)}$ is data distribution obtained by inputting $P_{E(\cdot|x)}$ into the generator G, D(x, z) indicates that x and z are inputted into the discriminator D, $\mathbb{E}_{Z \sim PE(\cdot|x)}$ indicates a mathematical expectation of solving the distribution generated by the encoder, $\mathbb{E}_{x \sim px}$ indicates an expectation of solving the distribution of the real data, $\mathbb{E}_{x \sim PG(\cdot|z)}$ indicates a mathematical expectation of solving the distribution generated by the generator, and $\mathbb{E}_{z \sim Pz}$ indicates a mathematical expectation of solving the distribution of the potential distribution.

In a minimax adversarial training, training the discriminator D allows to distinguish input samples are from the encoder E or the generator G in pair with maximum probability; and training the encoder E or the generator G is intended to minimize [1-log D(x, z)], i.e. maximize the loss of the discriminator D. During the training, one party keeps unchanged, and parameters of another network are updated; after alternate iteration, errors of the other party are maximized; and finally, the generator G can estimate the distribution of sample data, that is, a generated sample is more real. At the same time, the purpose of training the generator G is to hope that D(x, z) is close to 1, that is, a positive class, so that the loss of the generator G is minimal. Moreover, the training of the discriminator D is class 2, with the purpose of distinguishing real data and generated data, that is, it is hoped that the output of the discriminator D of the real data is close to 1, and the output of the generated data, i.e. D(x, z), is close to 0 or is a negative class. This embodies an adversarial idea. After the adversarial training, the generated data distribution is identical to actual distribution, and the encoder E, the generator G, and the discriminator D are at the Nash equilibrium state. During the whole minimax adversarial processing, the encoder E, the generator G, and the discriminator D compete with one another; the generator G attempts to generate the sample distribution that can cheat the discriminator D successfully; the encoder E maps the real data to the potential representation; the discriminator D tries to distinguish whether the input sample comes from the real data or a generated sample of the generator G, and distinguish whether the potential representation is the input of the generator G or the output of the encoder E, thus improving the mapping capability of the encoder E, the normal feature extraction capability of the generator G and the normal feature enhancement capability of the discriminator D.

S3: obtain the total anomaly score based on the first anomaly score and the second anomaly score.

Specifically, acquire an equilibrium parameter, and based on the equilibrium parameter, carry out weighting on the first anomaly score and the second anomaly score to obtain the total anomaly score.

The total anomaly score can be implemented through the following formula:

$$A(x') = \lambda R(x') + (1 - \lambda)L(x'),$$

$$R(x') = \|x' - G(z)\|_1,$$

$$L(x') = \sigma(D(x'), 1),$$

A (x') is the total anomaly score of the real data distribution x' of the node, $\lambda$ is the equilibrium parameter, and $\lambda \geq 0$; R(x') is the first anomaly score and is an absolute value of a difference value between the normal feature expression in the real data distribution x' and the normal feature expression of the first normal data distribution obtained by the potential representation distribution z inputted to the generator G; and L(x') is the second anomaly score and is a cross-entropy loss between the normal feature expression of the real data distribution x', which is calculated by using a cross-entropy loss function σ, and the normal feature expression of the second normal data distribution, which is obtained by inputting the real data distribution x' into the discriminator D.

S4: compare the total anomaly score with the threshold to obtain the anomaly risk level.

Specifically, if the total anomaly score is less than a first threshold, an abnormal data risk level of the node is a first risk level; if the total anomaly score is not less than the first threshold and not greater than a second threshold, the abnormal data risk level of the node is a second risk level; if the total anomaly score is greater than the second threshold and less than a third threshold, the abnormal data risk level of the node is a third risk level; and if the total anomaly score is not less than the third threshold, the abnormal data risk level of the node is a fourth risk level.

The first threshold is 0.3, the second threshold is 0.5, the third threshold is 0.8, and the fourth threshold is 1.

S5: update the communication permission of the node based the anomaly risk level.

Specifically, if the abnormal data risk level of the node is the first risk level, open all communication permissions to a corresponding node; if the abnormal data risk level of the node is the second risk level, only allow the corresponding node to communicate with the node at the first risk level and immediately repair the corresponding node; if the abnormal data risk level of the node is the third risk level, delay the time when the corresponding node enters the industrial Internet, and detect the corresponding node for multiple times within a preset period; and if the abnormal data risk level of the node is the fourth risk level, eliminate the corresponding mode from the industrial Internet.

In this embodiment, a cloud computing module is utilized to receive and save data of the corresponding nodes at the second risk level, the third risk level, and the fourth risk level, and send a warning to an enterprise side of the industrial Internet. Moreover, device IDs with corresponding node data at the second risk level, the third risk level, and the fourth risk level will be recorded as abnormal device IDs; and the cloud computing module will generate a security log according to accepted data, and issue same to an enterprise terminal so as to provide supports for repairing and maintenance of the device.

Figure 2:
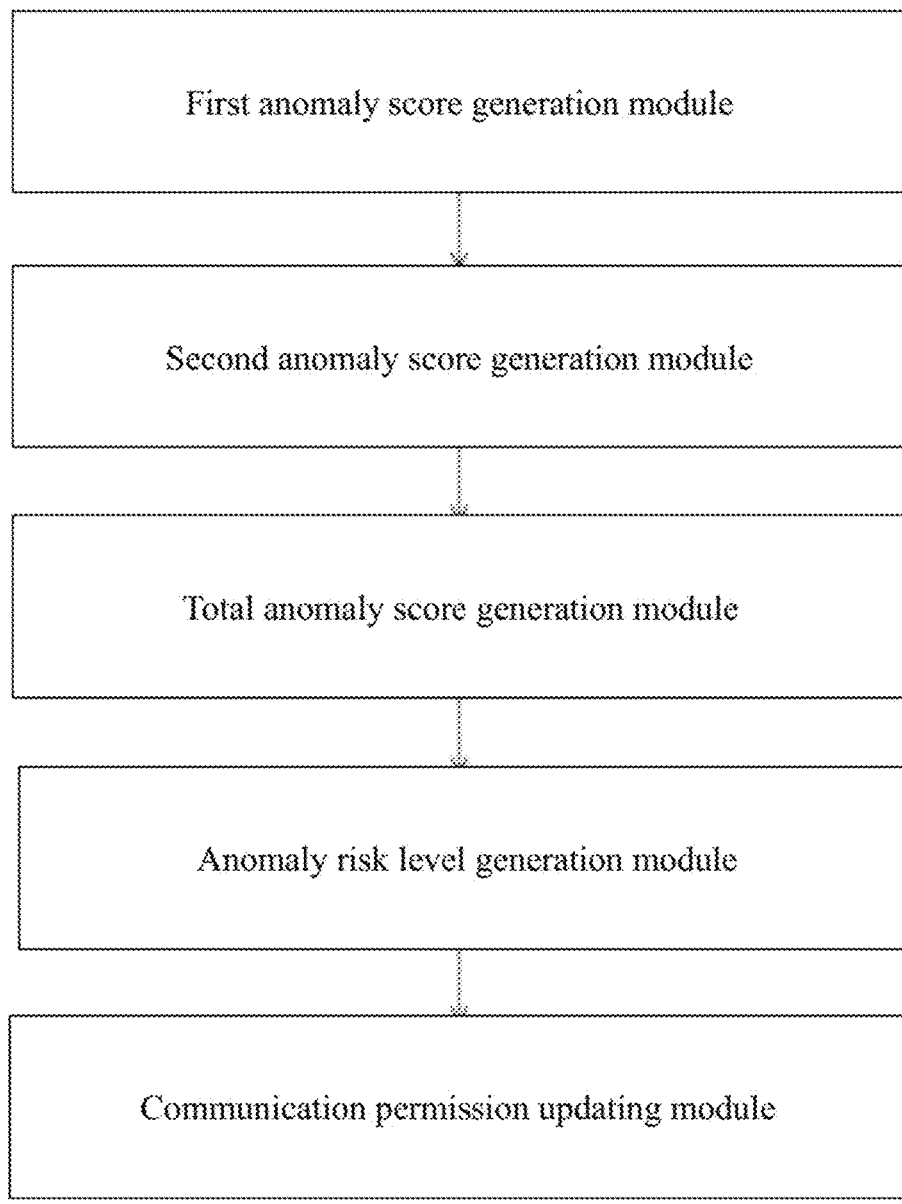
FIG. 2 is a schematic structural diagram of a detection system in an embodiment.

This embodiment provides an abnormal data detection system for industrial Internet, as shown in FIG. 2, including:
- a first anomaly score generation module, configured to: acquire real data distribution of a node and obtain potential representation distribution based on mapping processing; perform normal feature extraction processing on the potential representation distribution to obtain first normal data distribution; and compare real data distribution with the first normal data distribution to obtain a first anomaly score;
- a second anomaly score generation module, configured to: perform normal feature enhancement processing on the real data distribution of the node to obtain second normal data distribution; and compare the real data distribution with the second normal data distribution to obtain a second anomaly score;
- a total anomaly score generation module, configured to obtain a total anomaly score based on the first anomaly score and the second anomaly score;
- an anomaly risk level generation module, configured to compare the total anomaly score with a threshold to obtain an anomaly risk level; and
- a communication permission updating module, configured to update a communication permission of the node based the abnormal data risk level.

Figure 3:
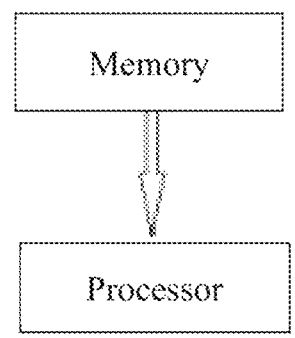
FIG. 3 is a schematic structural diagram of a detection device in an embodiment.

This embodiment provides an abnormal data detection system device for industrial Internet, as shown in FIG. 3, including a processor and a memory, where the processor implements the abnormal data detection method for industrial Internet described above when executing a computer program saved in the memory.

This embodiment provides a computer readable storage medium, which is configured to store a computer program, where the computer program implements the abnormal data detection method for industrial Internet described above when being executed by a processor.

This embodiment provides an abnormal data detection method for industrial Internet, which compares the data distribution of an initial node with a normal feature expression performance in the first normal data distribution subject to extraction processing to obtain the first anomaly score, compares the data distribution of the initial node with the normal feature expression performance in second normal data distribution subject to enhancement processing to obtain the second anomaly score, obtains a risk level of the node based on the first anomaly score and the second anomaly score, and immediately provides corresponding limits on the node communication permission; and the method provides dual detection, is high in accuracy and stable in detection results, and facilitates the maintenance of industrial Internet security.

This embodiment provides an abnormal data detection method for industrial Internet, which utilizes a training set containing only normal nodes to perform evolutionary training on the generator, enhance the normal feature extraction capability and stability of the generator, and improve the detection efficiency of the detection method and the accuracy of final calculation results; in addition, the encoder, the generator and the discriminator are also subject to the minimax adversarial processing, thus improving the mapping capability of the encoder, the normal feature extraction capability of the generator, and the normal feature enhancement capability of the discriminator, enhances the stability and calculation efficiency when high-dimensional data is processed by the detection method, and improves the stability and accuracy of the detection method.

What is claimed is:

1. An abnormal data detection method for industrial Internet, comprising the following operations:
   S1: acquiring real data distribution of a node and obtaining potential representation distribution based on the real data distribution; performing normal feature extraction on the potential representation distribution to obtain first normal data distribution; and comparing the real data distribution with the first normal data distribution to obtain a first anomaly score;
   the operation of obtaining the potential representation distribution being implemented through a minimax adversarial encoder; and the minimax adversarial encoder being used for converting the real data distribution into the potential representation distribution;
   the operation of obtaining the first normal data distribution being implemented through a minimax adversarial generator; and the minimax adversarial generator being used for converting the potential representation distribution into the first normal data distribution;
   before the generator is subjected to minimax adversarial processing, further comprising performing evolutionary training on the generator;
   the operation of the evolutionary training specifically comprising: step 1: converting normal data distribution in a node training set into potential representation distribution, and inputting the potential representation distribution into the generator to obtain a parent sample; step 2: performing variation on the parent sample to obtain a child sample; step 3: obtaining a quality evaluation score based on feature expression of the child sample, wherein the quality evaluation score is obtained based on a generated sample quality score and a generated sample diversity score, the generated sample quality score is an expected value of normal feature representation in the child sample, and the generated sample diversity score is obtained based on the normal feature representation in the normal data distribution and the normal feature representation in the child sample; step 4: if the quality evaluation score is less than a first predetermined value, eliminating the corresponding child sample; if the quality evaluation score is not less than the first predetermined value, performing step 5; and step 5: if the quality evaluation score is less than a second predetermined value, performing step 2 on the corresponding child sample as a new parent sample; and if the quality evaluation score is not less than the second predetermined value, finishing the evolutionary training;
   S2: performing normal feature enhancement on the real data distribution of the node to obtain second normal data distribution; and comparing the real data distribution with the second normal data distribution to obtain a second anomaly score;
   the operation of obtaining the second normal data distribution being implemented through a minimax adversarial discriminator; and the minimax adversarial discriminator being used for converting the real data distribution into the second normal data distribution;
   S3: calculating a total anomaly score based on the first anomaly score and the second anomaly score;
   S4: determining an anomaly risk level by comparing the total anomaly score with thresholds of different risk levels, wherein:

if the total anomaly score is less than a first threshold, the abnormal data risk level of the node being a first risk level;

if the total anomaly score is not less than the first threshold and not greater than a second threshold, the abnormal data risk level of the node being a second risk level;

if the total anomaly score is greater than the second threshold and less than a third threshold, the abnormal data risk level of the node being a third risk level; and if the total anomaly score is not less than a third threshold, the abnormal data risk level of the node being a fourth risk level; and S5: updating a communication permission of the node based on the determined anomaly risk level.

2. The abnormal data detection method according to claim 1, wherein the operation of the minimax adversarial processing specifically comprises:

acquiring an objective function including the encoder, the generator and the discriminator, and enabling the encoder, the generator and the discriminator to reach a Nash equilibrium state through a game of minimizing the value of the objective function and maximizing the value of the objective function.

3. The abnormal data detection method according to claim 1, wherein the operation of S3 specifically comprises: acquiring an equilibrium parameter, and based on the equilibrium parameter, calculating the total anomaly score by weighting on the first anomaly score and the second anomaly score.

4. An abnormal data detection system for industrial Internet, comprising a processor and a memory storing program codes, the processor executing the stored program codes for:

acquiring real data distribution of a node and obtain potential representation distribution based on the real data distribution; performing normal feature extraction on the potential representation distribution to obtain first normal data distribution; comparing the real data distribution with the first normal data distribution to obtain a first anomaly score; the operation of obtaining the potential representation distribution being implemented through a minimax adversarial encoder; the minimax adversarial encoder being used for converting the real data distribution into the potential representation distribution; the operation of obtaining the first normal data distribution being implemented through a minimax adversarial generator; the minimax adversarial generator being used for converting the potential representation distribution into the first normal data distribution; before the generator is subjected to minimax adversarial processing, further comprising performing evolutionary training on the generator; the operation of the evolutionary training specifically comprising: step 1: converting normal data distribution in a node training set into potential representation distribution, and inputting the potential representation distribution into the generator to obtain a parent sample; step 2: performing variation on the parent sample to obtain a child sample; step 3: obtaining a quality evaluation score based on feature expression of the child sample, wherein the quality evaluation score is obtained based on a generated sample quality score and a generated sample diversity score, the generated sample quality score is an expected value of normal feature representation in the child sample, and the generated sample diversity score is obtained based on the normal feature representation in the normal data distribution and the normal feature representation in the child sample; step 4: if the quality evaluation score is less than a first predetermined value, eliminating the corresponding child sample; if the quality evaluation score is not less than the first predetermined value, performing step 5; and step 5: if the quality evaluation score is less than a second predetermined value, performing step 2 on the corresponding child sample as a new parent sample; and if the quality evaluation score is not less than the second predetermined value, finishing the evolutionary training;

performing normal feature enhancement on the real data distribution of the node to obtain second normal data distribution; comparing the real data distribution with the second normal data distribution to obtain a second anomaly score; the operation of obtaining the second normal data distribution being implemented through a minimax adversarial discriminator; and the minimax adversarial discriminator being used for converting the real data distribution into the second normal data;

calculating a total anomaly score based on the first anomaly score and the second anomaly score;

determining the total anomaly score with thresholds of different risk levels, wherein if the total anomaly score is less than a first threshold, the abnormal data risk level of the node being a first risk level;

if the total anomaly score is not less than the first threshold and not greater than a second threshold, the abnormal data risk level of the node being a second risk level;

if the total anomaly score is greater than the second threshold and less than a third threshold, the abnormal data risk level of the node being a third risk level; and if the total anomaly score is not less than a third threshold, the abnormal data risk level of the node being a fourth risk level; and updating a communication permission of the node based on the determined abnormal data risk level.

* * * * *